United States Patent [19]
Jang

[11] Patent Number: 5,886,485
[45] Date of Patent: Mar. 23, 1999

[54] SENSORLESS BLDC MOTOR AND A MANUFACTURING METHOD THEREOF

[75] Inventor: Hyun-Gil Jang, Suwon, Rep. of Korea

[73] Assignee: Samsung Electronics Co., LTD., Suwon, Rep. of Korea

[21] Appl. No.: 927,477

[22] Filed: Sep. 11, 1997

[30] Foreign Application Priority Data

Sep. 14, 1996 [KR] Rep. of Korea .......................... 40050

[51] Int. Cl.$^6$ ...................................................... H02P 6/18
[52] U.S. Cl. ........................................... 318/254; 318/439
[58] Field of Search .................................. 318/138, 254, 318/439, 700, 716, 720, 721, 722, 724

[56] References Cited

U.S. PATENT DOCUMENTS

| | | | |
|---|---|---|---|
| 5,134,349 | 7/1992 | Kruse | 318/254 |
| 5,635,810 | 6/1997 | Goel | 318/719 |

*Primary Examiner*—Bentsu Ro
*Attorney, Agent, or Firm*—Burns, Doane, Swecker & Mathis, L.L.P.

[57] ABSTRACT

Disclosed is a control system for detecting a rotor position in a sensorless brushless direct-current (BLDC) motor including a switching element for changing current flow direction between each phase and for performing a switching operation; a dividing circuit for dividing counter-electromotive force generated in an open phase when the switching element is operating; and an A/D converter for converting analogue values of the dividing circuit into digital values.

4 Claims, 3 Drawing Sheets

SENSORLESS BLDC MOTOR AND A MANUFACTURING METHOD THEREOF

FIELD OF THE INVENTION

The present invention relates to a sensorless and brushless direct-current (BLDC) motor and a manufacturing method thereof, and more particularly, to a sensorless BLDC motor and a manufacturing method thereof which does not utilize a sensor for detecting a position of a rotor in a motor, but, instead, uses a software method to detect rotor position and a switching element after a predetermined amount of time according to the detected rotor position.

BACKGROUND OF THE INVENTION

Generally, BLDC motors use semiconductor drive circuits in DC motors such that commutators, brushes, etc. are not needed. Namely, BLDC motors are able to control current using semiconductors, and include an armature performing a stator function, a permanent magnet performing a rotor function, and a position detecting portion performing a brush and commutator function.

The BLDC motor structured as in the above is controlled by detecting the position of the rotor then applying current to a stator according to this position such that motor rotation is controlled. The position detecting portion is provided to detect the position of the rotor and uses either a Hall method using a Hall element, an optical method, a high frequency induction method, a high frequency oscillation method, a reed switch method, or a magnetoresistive element method to detect the position of the rotor.

However, when using a BLDC motor in a compressor, high temperatures and high pressures caused by coolant compression can reduce the reliability of a sensor, and wiring of the position detecting sensor inside the BLDC motor complicates the manufacturing process and increases the size of the motor.

SUMMARY OF THE INVENTION

The present invention has been made in an effort to solve the above problems.

It is an object of the present invention to provide a sensorless BLDC motor and a manufacturing method thereof which does not utilize a rotor position detecting sensor, but, instead, uses counter-electromotive force to detect rotor position, and determines switch timing of a switching element according to the detected position to perform switching of current direction to control motor rotation.

To achieve the above object, the present invention provides a control system for detecting a rotor position in a sensorless and brushless direct-current (BLDC) motor including a switching element for changing current flow direction between each phase and for performing a switching operation, a dividing circuit for dividing counter-electromotive force generated in an open phase when the switching element is operating, and an A/D converter for converting analogue values of the dividing circuit into digital values.

A method for controlling a BLDC motor having a switching element for switching current flowing to a stator according to a position of a rotor comprising the steps of detecting counter-electromotive force, generated in an open phase of the brushless motor, using current flow of the switching element; converting the detected counter-electromotive force into a digital wave; dividing pulse values into an initial value, an intermediate value, and a present value and reading the values in this order; comparing the initial value and the intermediate value with a predetermined zero cross point (ZCP); determining if the intermediate value is larger than the ZCP and if the initial value is smaller than the ZCP; determining if the intermediate value is larger than the initial value, the intermediate value is smaller than the present value, and the intermediate value is larger than the ZCP when the intermediate value is larger than the ZCP and the initial value is smaller than the ZCP; delaying current flow of the switching element for a predetermined amount of time if the intermediate value is larger than the initial value, the intermediate value is smaller than the present value, and the intermediate value is larger than the ZCP; and switching current to a fixed direction in a phase of the stator after said predetermined amount of time has elapsed.

According to a feature of the present invention, the predetermined amount of time is the time said pulse waves move by 30°.

According to another feature of the present invention, if the intermediate value is larger than the initial value, the intermediate value is smaller than the present value, and the intermediate value is larger than the ZCP, the initial, intermediate, and present values are reset.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
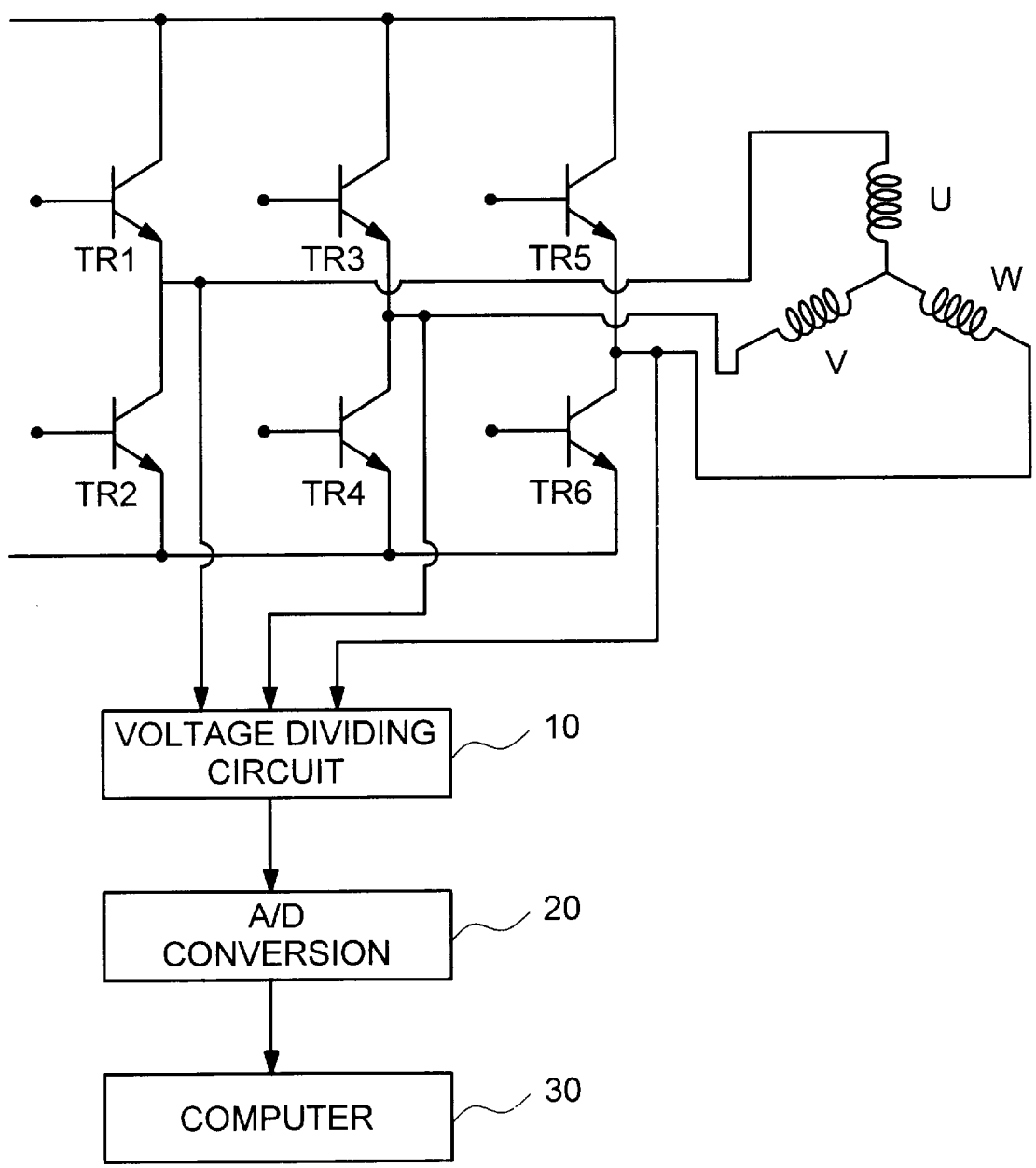
FIG. 1 is a circuit diagram of a sensorless BLDC motor according to a preferred embodiment of the present invention.

Referring to FIG. 1, illustrated is a circuit diagram of a sensorless BLDC motor according to a preferred embodiment of the present invention. If a base potential of a transistor, which is a switching element, rises, current flows between a collector and an emitter by a switching operation of the transistor, generating electromotive force in a stator coil of a motor applied to drive the motor. For instance, an initial state, when current flows in a first transistor TR1, current flows in a coil connected to a U-phase and a V-phase. When current flows first in the U-phase then the V-phase, electromotive force is applied to a rotor to drive the motor, and the current flows to a fourth transistor TR4. By selective activation of the other transistors TR2, TR3, TR5 and TR6 the brush and commutator function is performed.

The rotation of the motor is done by Fleming's left-hand rule, while, at the same time, the motor also becomes a generator according to Fleming's right-hand rule such that an open W-phase generates counter-electromotive force relative to the number of rotations. As a maximum voltage of the counter-electromotive force can be 280 V in the exemplary embodiment, the counter-electromotive force is divided to low voltage in a dividing circuit 10, having a resistor, and is converted from an analogue value to a digital value by an A/D converter 20. A current flow time of the switching element is precisely controlled according to the converted digital value.

Figure 2:
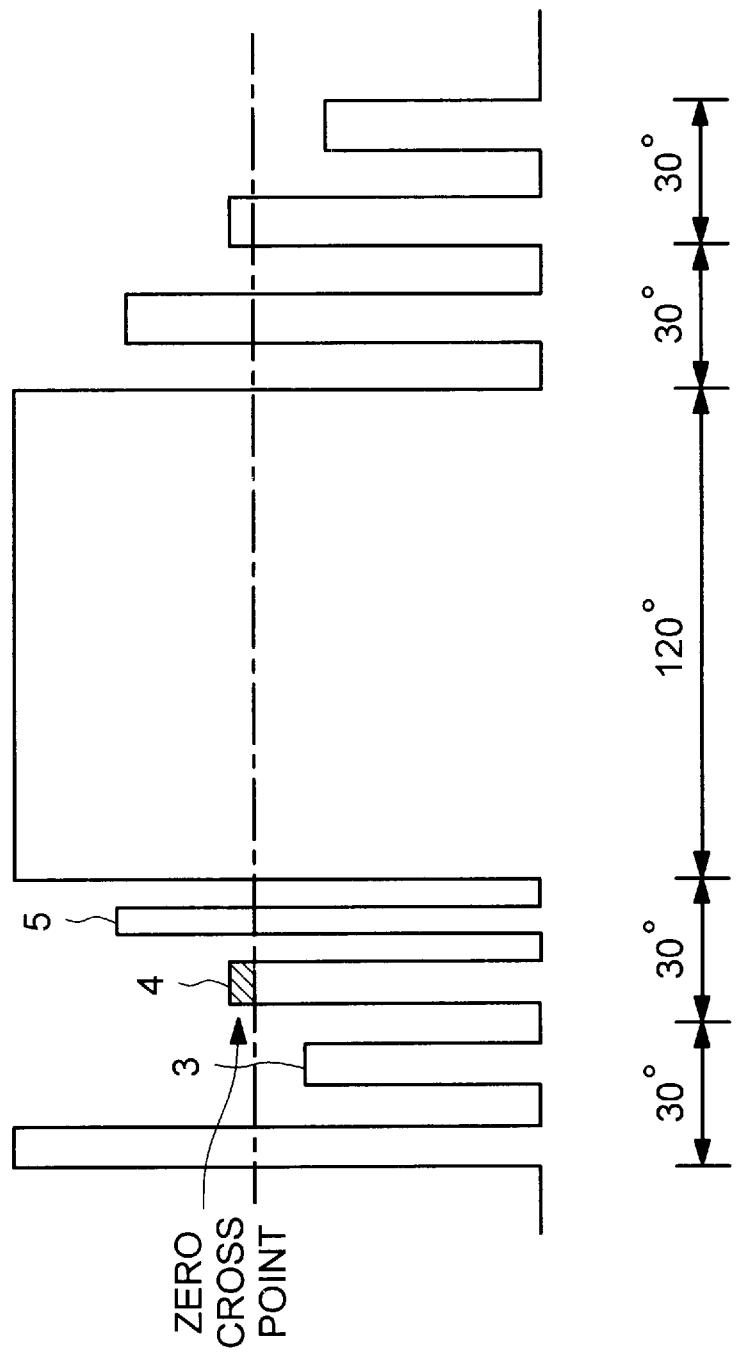
FIG. 2 is a graph illustrating a wave form of counter-electromotive force that has been A/D converted according to a preferred embodiment of the present invention.

In FIG. 2, there is shown a graph illustrating a wave form of counter-electromotive force that has been A/D converted. A digitized wave form according to a phase angle of the rotor is shown, and in FIG. 3, there is shown a flow chart of a control method of the sensorless BLDC motor according to a preferred embodiment of the present invention.

If the base potential of a transistor, controlled by a micro-computer 30, rises, current flows between the collector and the emitter by the switching operation, generating electromotive force in a stator coil of a motor to drive the motor. At this point, counter-electromotive force, relative to the position of rotation of the motor, is generated in an open phase by Fleming's right-hand rule. Here, the voltage generated by the counter-electromotive force is divided by the dividing circuit 10, having a resistor, to be converted to low voltage then A/D converted to realize a pulse wave (step 100). In the step 100, three of the pulse values are divided into an initial value 3, an intermediate value 4, and a present value 5 (step 120) and read in this order.

Next, it is determined if the intermediate value 4 is larger than a zero cross point (ZCP) preset in a program, and if the initial value 3 is smaller than the ZCP (step 140). In the step 140, if the above two conditions are met, step 160 is performed. However, in the step 140 if either or both of the conditions are not met, the process is repeated starting with the step 100. Thus, step 140 determines if whether the waveform generated by the counter-electromotive force is ±30° from when the current should be switched in phase with the stator.

In the step 160, it is determined if the intermediate value 4 is larger than the initial value 3 to detect whether the waveform is 30° away from peak (i.e., is at the left hand side, rather than the right hand side, of the waveform shown in FIG. 2). If the intermediate value 4 is smaller than the present value 5, and if the intermediate value 4 is larger than the ZCP. In this step, if all the conditions are met, the current flow timing is delayed by 30' in a 30' delay timer, and current flows along a stator by switching the switching element to allow smooth rotation of the motor rotor (step 200). In step 220, counter-electromotive force, generated in the opened phase according to rotor rotation, is detected then goes to a return step.

However, if any or all of the conditions are not met in the step 160, the A/D converter value is read (step 170). Here, the initial value 3 read in the step 120 is abandoned, and the intermediate value 4 is used as the new initial value, the present value 5 as the new intermediate value, and the value being read as the new present value.

Next, the process identical to that in the step 140 is performed in step 180. Namely, it is determined if the new intermediate value is larger than the ZCP, and if the new initial value is smaller than the ZCP. In this step, if the new intermediate value is larger than the ZCP and the new initial value smaller than the ZCP, the step 160 is repeated. However, if the conditions are not met, the step 170 is again repeated and the data values are increased one at a time to reset the initial, intermediate, and present values to find the ZCP using a software method, thus effectively searching for the portion of the waveform corresponding to the amount of delay imposed by the delay times. It is noted that other periods than a delay time corresponding to 30° can be used, and that FIG. 2 shows only a few pulses for ease of explanation. More pulses could be involved, depending on the desired resolution and the resolution of the A/D converter 20.

Figure 3:
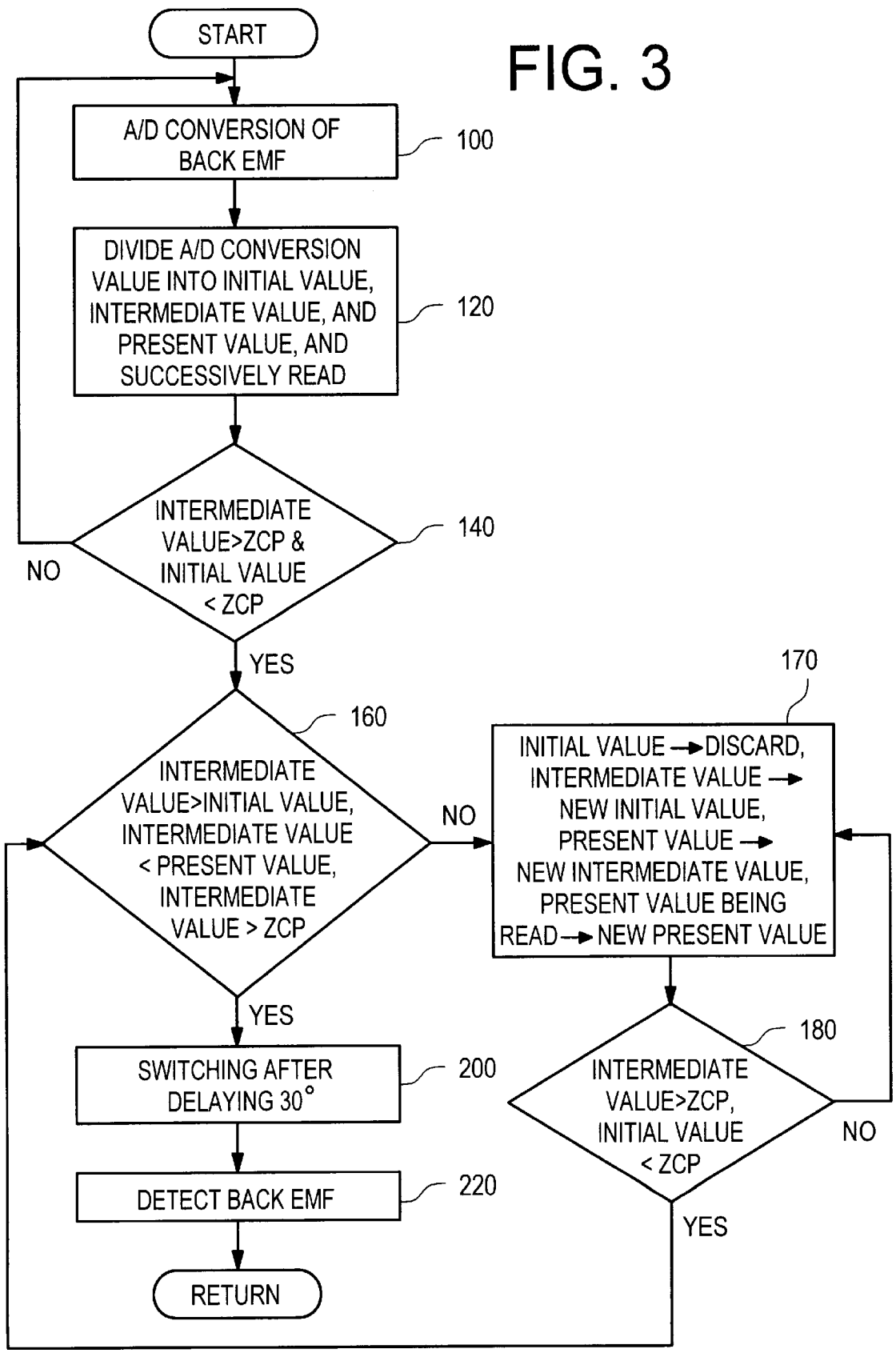
FIG. 3 is a flow chart of a control method of the sensorless BLDC motor according to a preferred embodiment of the present invention.

FIG. 3 illustrates a flow chart applied when counter-electromotive force wave form increases. When counter-electromotive force wave form decreases, the conditions of the steps 140, 160, and 180 are reversed to detect ZCP.

In the above sensorless BLDC motor according to a preferred embodiment of the present invention, the wave form of counter-electromotive force is detected and the wave form values are compared and determined to detect rotor position. After a predetermined amount of time has elapsed, the switching element is switched and current flows to the stator to control motor rotation. Namely, the circuits can be simply comprised and current flow timing can be precisely controlled to increase the efficiency and effectiveness of the sensorless BLDC motor.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A control system for controlling a sensorless and brushless direct-current (BLDC) motor, comprising:

a switching element for changing current flow direction between each phase and for performing a switching operation;

an A/D converter for converting analog values corresponding to counter-electromotive force generated in an open phase when the switching element is operating; and control means for controlling said switching element in response to signals output from said A/D converter;

wherein said control means compares an initial value and an intermediate value of the output signals of said A/D converter with a predetermined zero cross point (ZCP), determines if the intermediate value is larger than the ZCP and if the initial value is smaller than the ZCP, and determines if the intermediate value is larger than the initial value, the intermediate value is smaller than a present value, and delays the current flow of the switching element for a predetermined amount of time if the intermediate value is larger than the initial value, the intermediate value is smaller than the present value, and the intermediate value is larger than the ZCP.

2. A method for controlling a BLDC motor having a switching element for switching current flowing to a stator according to a position of a rotor comprising the steps of:

detecting counter-electromotive force, generated in an open phase of the brushless motor, using current flow of the switching element;

converting the detected counter-electromotive force into a pulse wave;

dividing pulse wave into an initial value, an intermediate value, and a present value and reading the values in this order;

comparing the initial value and the intermediate value with a predetermined zero cross point (ZCP);

determining if the intermediate value is larger than the ZCP and if the initial value is smaller than the ZCP;

determining if the intermediate value is larger than the initial value, the intermediate value is smaller than the present value, and the intermediate value is larger than the ZCP when the intermediate value is larger than the ZCP and the initial value is smaller than the ZCP;

delaying current flow of the switching element for a predetermined amount of time if the intermediate value is larger than the initial value, the intermediate value is smaller than the present value, and the intermediate value is larger than the ZCP; and switching current to a fixed direction in a phase of the stator after said predetermined amount of time has elapsed.

3. The method of claim 2, wherein the predetermined amount of time is the time said pulse waves move by 30°.

4. The method of claim 2, wherein if the intermediate value is larger than the initial value, the intermediate value is smaller than the present value, and the intermediate value is larger than the ZCP, the initial, intermediate, and present values are reset.

* * * * *